United States Patent [19]

Deley et al.

[11] Patent Number: 4,685,737

[45] Date of Patent: Aug. 11, 1987

[54] ADJUSTABLE HEADREST FOR A MOTOR VEHICLE SEAT STRUCTURE OR THE LIKE

[75] Inventors: Serge Deley, Seloncourt; François Fourrey, Montbeliard, both of France

[73] Assignee: Cycles Peugeot, Valentigney, France

[21] Appl. No.: 925,576

[22] Filed: Oct. 31, 1986

[30] Foreign Application Priority Data

May 22, 1986 [FR] France ................................ 86 07287

[51] Int. Cl.[4] ................................................ A47C 1/10
[52] U.S. Cl. .................................... 297/408; 297/403; 297/410
[58] Field of Search ................. 297/391, 403, 408, 410

[56] References Cited

U.S. PATENT DOCUMENTS

| 4,351,563 | 9/1982 | Hattori | 297/408 |
| 4,511,180 | 4/1985 | Klaus | 297/408 |
| 4,576,411 | 3/1986 | Kitamura | 297/403 X |

Primary Examiner—Philip C. Kannan
Attorney, Agent, or Firm—Sughrue, Mion, Zinn, Macpeak & Seas

[57] ABSTRACT

The headrest comprises on one side a sector (24) fixed to the support for mounting the headrest on the seat, and a movable sector (30) connected to the framework (12) carrying a cushion. A link (10) is pivotally mounted at its ends on pivot pins (22, 28) extending through these sectors, and a spring wire fixed to the pivot pin (22) of the fixed sector and connected to a control knob which is axially movable, slides in the slot of the pivot pin (28) of the movable sector between a position in which it is engaged in the facing notches of the two sectors for locking the headrest and a position in which it is disengaged from these notches for releasing the headrest.

8 Claims, 7 Drawing Figures

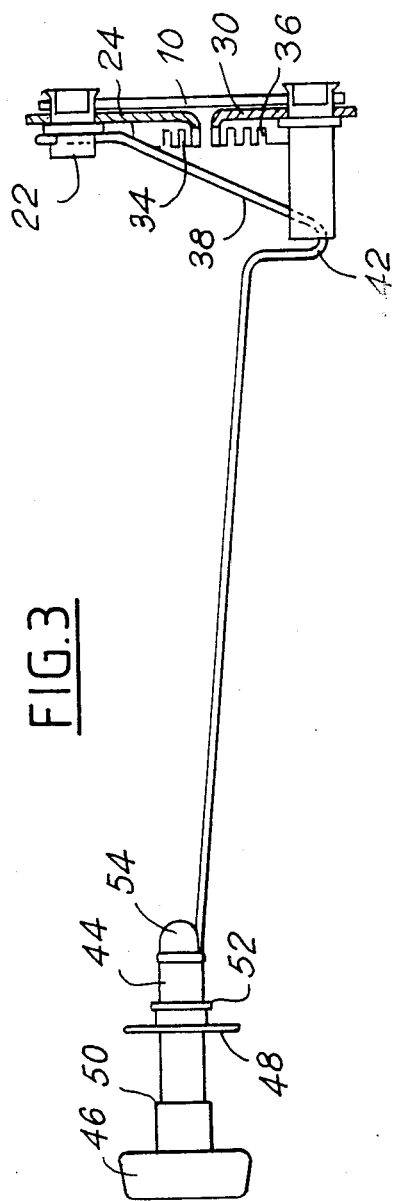
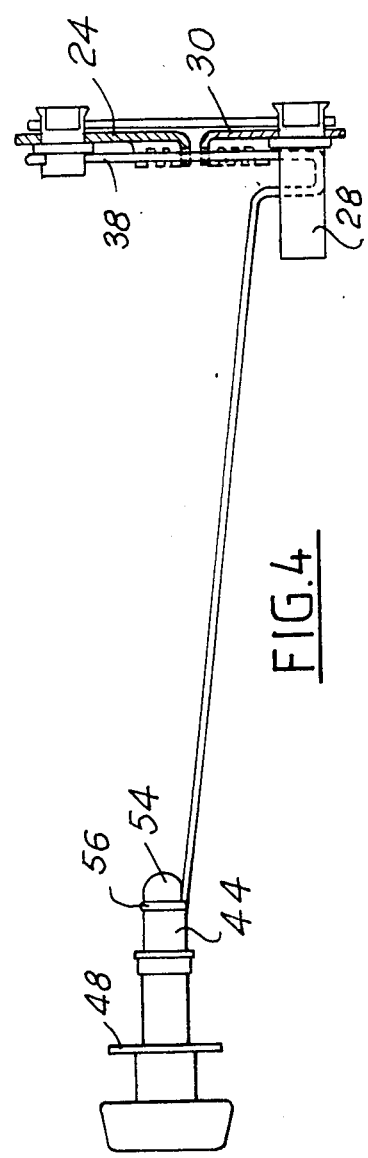

ADJUSTABLE HEADREST FOR A MOTOR VEHICLE SEAT STRUCTURE OR THE LIKE

Headrests are in increasing demand by motor vehicle users whether they are for the driver or the passengers, but they are only really appreciated if they can be adjusted in accordance with the morphology of the users. Now, this requirement requires providing them with devices which are often complicated and, consequently, expensive.

An object of the present invention is to overcome this drawback by providing an adjustable headrest which is both easy to adjust and cheap to produce.

The invention therefore provides an adjustable headrest comprising a rigid framework for supporting a padding cushion which is connected on each side by means of a pivotally mounted link to an upright for fixing to the backrest; on one of the sides of said framework, a vertical fixed sector which is connected to the lateral upright and through which extends the pivot pin of the link and provided with notches, and a vertical movable sector connected to the framework and having its concavity facing toward the concavity of the fixed sector and also provided with notches, the notches of the two sectors being oriented in the same direction; and a spring wire fixed at one end to the pivot pin mounting the link on the fixed sector, extending through the slot of the pivot pin mounting the link on the movable sector, and connected at its other end to a control element controlling the sliding thereof in said slot, between a locking position in the facing notches of the two sectors and a retracted position disengaged from the notches for releasing the movable element.

This headrest can assume extremely varied positions by moving with the link about the pivot pin mounting the latter on the fixed sector or solely by the pivoting of the movable sector on its pivot pin. On the other hand, a simple action on the control knob locks it in the chosen position.

The following description of an embodiment given by way of a non-limiting example and illustrated in the accompanying drawing will bring out the features and advantages of the invention.

In the drawings:

FIGS. 3 and 4 are diagrammatic views of the control device respectively in the unlocked and locked position;

Figure 1:
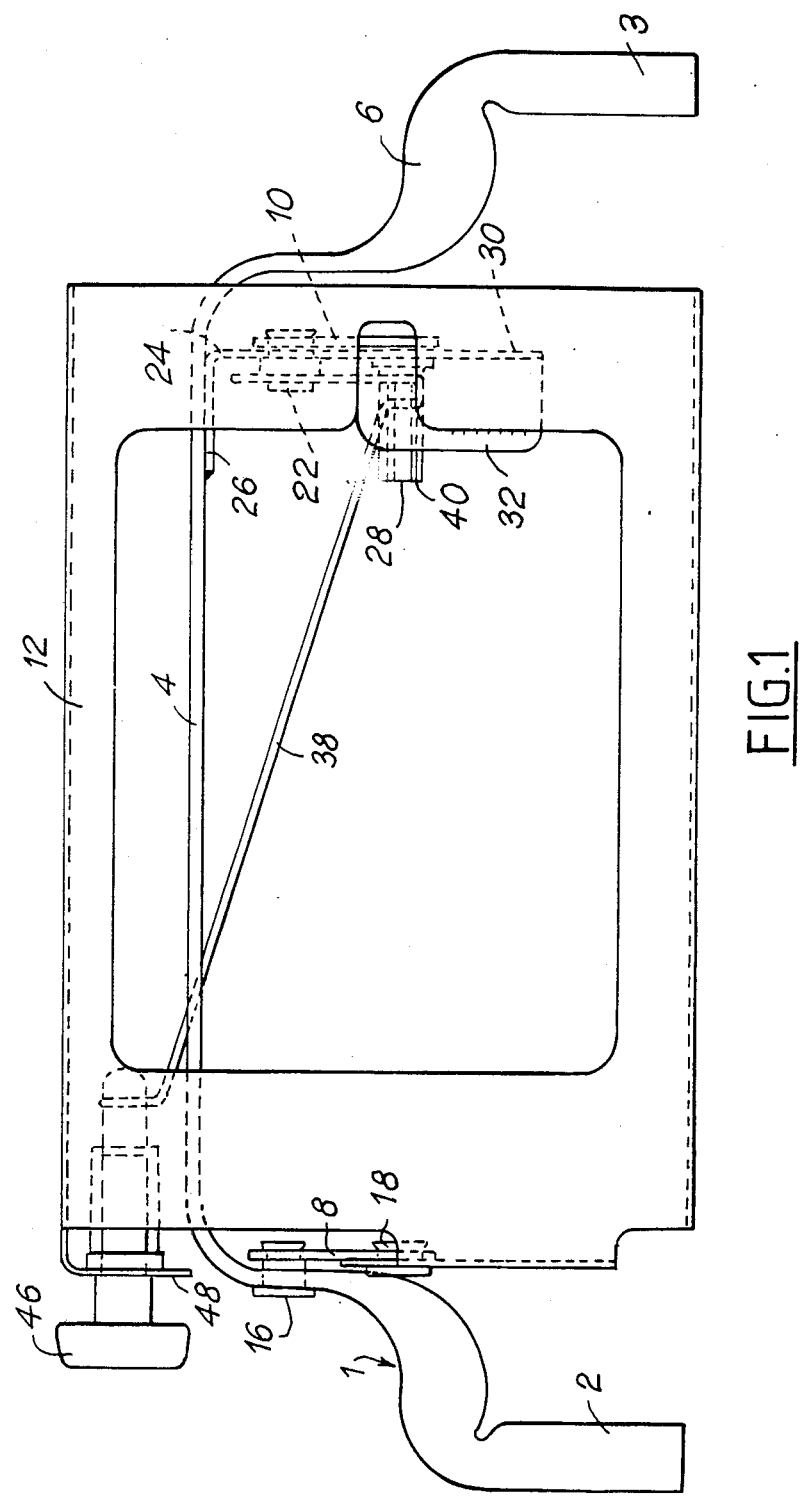
FIG. 1 is a front elevational view of the headrest whose padding has been removed.
Figure 2:
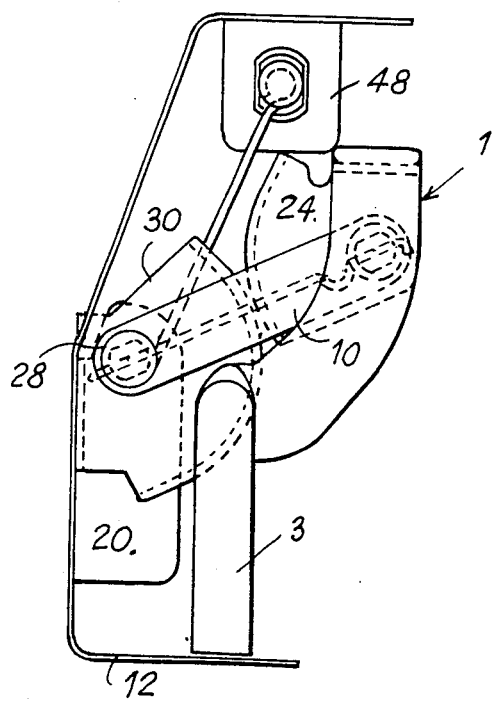
FIG. 2 is an elevational view from the right side of FIG. 1.

The illustrated headrest comprises a support 1 for fixing to the seat structure to which it must be adapted. The support 1 comprises therefore two vertical lateral uprights 2 and 3 which are interconnected by a horizontal bar 4.

The support 1 is connected by means of two pivotally mounted links 8 and 10 to a framework 12 adapted to carry a padding cushion. The link 8 is pivotally mounted at one of its ends by a pivot pin 16 on the support 1 and at its other end by a pivot pin 18 on a lateral tab 20 of the framework 12.

The link 10 which is located on the other side of the framework, i.e. on the right side as viewed in FIG. 1, is pivotally mounted at one of its ends on a fixed pin 22 which extends through substantially the centre of a sector 24 which is provided with a tab 26 perpendicular to its large side and is fixed by means of this tab under the bar 4 of the support 1. At its other end, the link 10 is also pivotally mounted on a fixed pivot pin 28 which extends through substantially the centre of a sector 30 provided with a tab 32 for fixing under the framework 12. Each of the sectors 24 and 30 has a series of notches 34 and 36 which are defined by teeth perpendicular to the corresponding sector, the two sectors being in a common vertical plane and their teeth extending in the same direction, as shown more clearly in FIGS. 3 and 4. Further, the radii of the fixed and movable sectors 24 and 30 and the length of the link 10 are so chosen that, in the region of this link, a slight space is provided between the two sectors irrespective of the relative position thereof.

The pin 22 carries on the end portion thereof opposed to the link 10 the end portion of a spring wire 38 which extends downwardly in the direction of the pin 28 of the movable sector 30. This pin has a diametrical slot 40 into which extends the wire 38 which forms a loop 42 in this region and is then laterally bent so as to extend throughout the length of the framework 12 and be wound on a control pin 44 connected to a control knob 46. The control pin 44 extends through a lug 48 connected to the framework 12 and has two spaced-apart shoulders 50 and 52 located on each side of the lug 48 and performing the function of a stop limiting the travel of the control element. Preferably, a ball joint 54 is mounted at the end of the control pin 44 so as to permit the pivoting of the end 56 of the spring wire 38 relative to this control pin.

Under the effect of the axial displacement of the control knob 46 and the pin 44, the spring wire 38 is shifted in the slot 40 of the pin 28 between the two positions shown in FIGS. 3 and 4. In FIG. 3, the loop 42 of the wire 48 is at the outer end of the pin 28 so that the wire 38 extends completely outside the notches 34 and 36 of the two sectors. On the other hand, when the control knob 46 has been urged toward the interior of the framework 12, as shown in FIG. 4, the loop 42 has slid to the end of the pin 28 and the spring wire 38 has entered two confronting notches of the sectors 24 and 30 so that it locks these sectors relative to each other and consequently prevents any movement of the movable sector 30. The headrest is then in its position of use.

If the user desires to change the position of the headrest, he must therefore pull on the control knob 46 and disengage the wire 38 from the notches 34 and 36.

Figure 5:
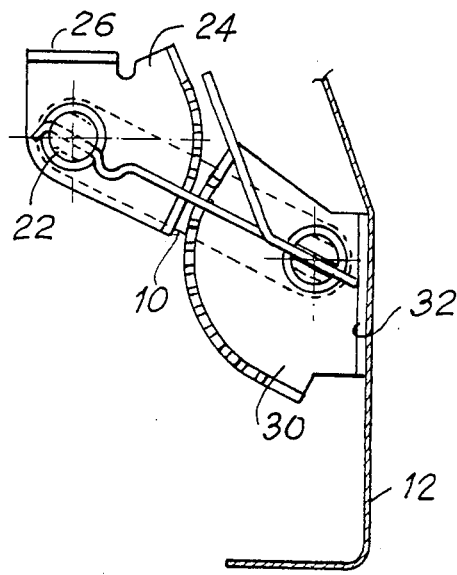
FIGS. 5, 6 and 7 are diagrammatic views of the position of the headrest and the fixed and movable sectors in three different positions, namely a lower, upper and advanced position.
Figure 6:
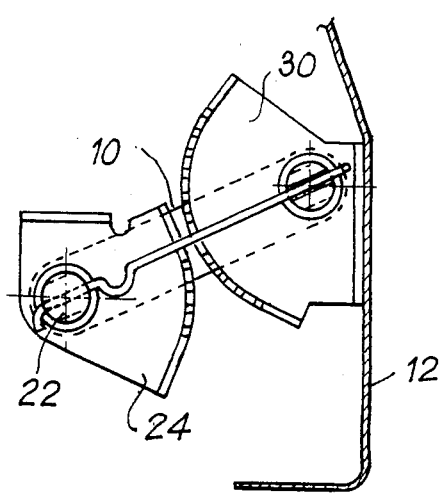

He can then shift the framework 12, for example by urging it upwardly, which causes the link 10 to pivot about its pivot pin 22 on the sector 24 while the sector 30 is moved while remaining substantially parallel to itself, as shown in FIGS. 5 and 6.

Figure 7:
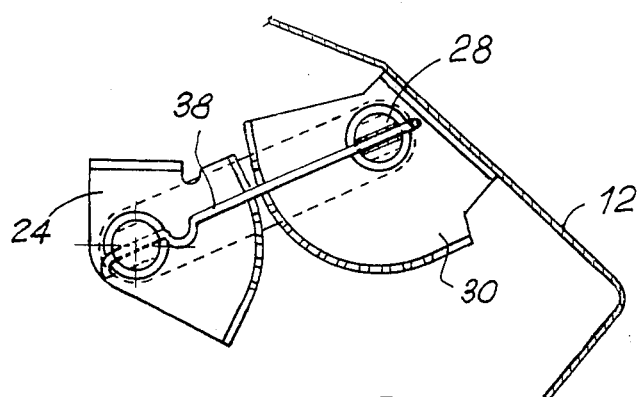

He can also advance the framework 10 by pivoting it about the pin 28 which causes the movable sector 30 to turn without shifting the link 10 and causes the whole of the headrest to move from the position shown in FIG. 6 to the position shown in FIG. 7.

When the desired position has been reached, the knob 46 is pushed in so as to once again lock the two sectors to each other and thus immobilize the headrest.

It will be understood that as the wire 38 is a spring wire, the headrest has a tendency, as soon as the movable sector is released, to resume its position of rest, so that the spring 38 is no longer under stress and retains its flexibility in operation of the assembly.

There is thus provided a headrest which is extremely easy to shift and which can assume very many positions so that it is particularly easy to adapt it to the morphology of the user.

What is claimed is:

1. An adjustable headrest unit for a seat structure having a backrest, the headrest unit comprising a rigid framework for supporting a padding cushion, lateral uprights adjacent to opposite sides of the framework for fixing the headrest unit to the backrest, links on said opposite sides of the framework for connecting the framework to the respective uprights, means for pivotally mounting a first end of the links on the framework, and means for pivotally mounting second ends of the links opposed to said first ends on the uprights, a fixed sector which is located adjacent to one of said sides of the framework, is fixed to the respective upright and has a peripheral portion which defines notches and has an outer convexity, a pivot pin which is part of said means for pivotally mounting the second end of the respective link on the upright and extends through the fixed sector, a vertical movable sector which is fixed to the framework and has a peripheral portion which defines notches and has an outer convexity which faces the outer convexity of the peripheral portion of the fixed sector, the notches of the two sectors being oriented in the same direction, and a spring wire fixed at one end thereof to said pivot pin, and a control element connected to an end of the spring wire opposed to said end thereof fixed to said pivot pin for controlling the displacement of said wire between a locking position of the spring wire engaged in said notches of the two sectors which face said spring wire and a position disengaged from said notches for releasing the movable sector from said fixed sector.

2. A headrest unit according to claim 1, wherein each sector is generally contained in a plane and said peripheral portion thereof defining said notches is perpendicular to said plane of the sector.

3. A headrest unit according to claim 1, wherein a second pivot pin is part of said means for connecting said first end of the respective link to said framework and includes a diametrical slot in which said spring wire is slidably mounted.

4. A headrest unit according to claim 3, wherein said spring wire defines a loop portion which is slidable in said diametrical slot.

5. A headrest unit according to claim 4, wherein said spring wire extends longitudinally of the framework and is connected to the control element which is axially movably mounted on one of said sides of the framework opposed to said sectors.

6. A headrest unit according to claim 1, wherein said fixed sector and movable sector are generally contained in a common vertical plane.

7. A headrest unit according to claim 1, wherein said fixed sector includes a fixing tab for fixing to the respective upright and said movable sector includes a fixing tab for fixing to said framework.

8. A headrest unit according to claim 1, wherein said two lateral uprights are part of a single tube which is bent and deformed in such manner as to constitute a support bar interconnecting the lateral uprights.

* * * * *